United States Patent
Fletcher

(10) Patent No.: US 7,734,708 B1
(45) Date of Patent: Jun. 8, 2010

(54) ENABLING IDENTIFICATION OF ONLINE IDENTITIES BETWEEN DIFFERENT MESSAGING SERVICES

(75) Inventor: George Fletcher, Round Hill, VA (US)

(73) Assignee: AOL Inc., Dulles, VA (US)

( * ) Notice: Subject to any disclaimer, the term of this patent is extended or adjusted under 35 U.S.C. 154(b) by 1870 days.

(21) Appl. No.: 10/744,349

(22) Filed: Dec. 22, 2003

(51) Int. Cl.
G06F 15/16 (2006.01)

(52) U.S. Cl. .................. 709/207; 709/204; 709/228

(58) Field of Classification Search ........... 709/238, 709/203, 22, 204, 207; 707/2
See application file for complete search history.

(56) References Cited

U.S. PATENT DOCUMENTS

| | | | |
|---|---|---|---|
| 6,366,950 B1 | 4/2002 | Scheussler et al. | 709/206 |
| 6,366,962 B1 | 4/2002 | Teibel | |
| 6,473,503 B1 | 10/2002 | Karau et al. | 379/221.13 |
| 6,993,564 B2 | 1/2006 | Whitten, II | |
| 7,051,049 B2 | 5/2006 | Samm | |
| 7,099,862 B2 * | 8/2006 | Fitzpatrick et al. | 707/3 |
| 7,139,555 B2 * | 11/2006 | Apfel | 455/412.2 |
| 7,139,806 B2 | 11/2006 | Hayes et al. | |
| 7,149,782 B2 | 12/2006 | Sommerer | |
| 7,525,951 B2 * | 4/2009 | Musil et al. | 370/352 |
| 2004/0054736 A1 * | 3/2004 | Daniell et al. | 709/206 |
| 2004/0243832 A1 * | 12/2004 | Wilf et al. | 713/200 |
| 2004/0254976 A1 | 12/2004 | Malik et al. | |
| 2005/0080859 A1 * | 4/2005 | Lake | 709/206 |
| 2005/0102257 A1 * | 5/2005 | Onyon et al. | 707/1 |

OTHER PUBLICATIONS

Applicant's Background Invention of the specification (p. 1).*
AOL Profile 1996 Annual Report, pp. 1-23.*
AOL.COM, Apr. 1999, pp. 1-24.*
WO 02/073886 A1, pp. 1-26.*

* cited by examiner

*Primary Examiner*—Karen C Tang
(74) *Attorney, Agent, or Firm*—Finnegan, Henderson, Farabow, Garrett & Dunner, LLP

(57) ABSTRACT

A method and system for populating identities in a message service involves registering a user of a first messaging service with a second messaging service. User identities for users other than the registered user may be identified. These user identities may be associated with the first messaging service and may be stored in a list associated with the registered user. It is determined if each identified user identity has a matching user identity associated with the second messaging service. If so, a database associated with the second messaging service is populated with the matching user identities. Determining whether a matching user identity exists may be performed, for example, by making character strings comparisons between user identities or using a database that stores a mapping of first messaging service user identities to second messaging service user identities. The mapping database may be generated as corresponding user identities are discovered.

22 Claims, 6 Drawing Sheets

ENABLING IDENTIFICATION OF ONLINE IDENTITIES BETWEEN DIFFERENT MESSAGING SERVICES

TECHNICAL FIELD

This description relates to online message services configured, for example, to identify matching online identities when switching between different online message services.

BACKGROUND

Numerous different service providers offer online messaging services, such as email and instant messaging. Such messaging services allow subscribers to communicate electronically through a wireless network, Internet, LAN, and/or other communication media. Subscribers are identified within each messaging service by a unique identifier, such as an identifier (e.g., a screen name) or email address. An instant messaging service offers users the ability to communicate with other users who are online and signed onto the instant messaging service who are on the same instant messaging service. Generally, each subscriber stores the identifiers of other subscribers with whom he communicates using instant messages in a contact list that is associated with the instant messaging service. The contact list may be stored locally on the subscriber's computer, PDA, or other communication device and/or may be stored remotely on a server associated with the instant messaging service.

Yet subscribers may only communicate with other subscribers. Thus, if a subscriber wants to switch to or add a new instant messaging service, the contact list for the original instant messaging service is not usable on the new service. Accordingly, if the subscriber wants to continue to exchange instant messages with some or all of the same people on the new service, the subscriber must first determine which of those people subscribe to the new service and/or convince others to switch to or add the new service, find out the identifier on the new service for each of the other people, and manually add each such identifier to the subscriber's contact list on the new service.

SUMMARY

Techniques are provided for simplifying the process of switching between messaging services. In particular, using the contents of a user's contact list for a first messaging service, corresponding user identities in a second messaging service may be identified either by analyzing similarities in the user identities or by looking for an entry in a mapping database that stores information linking user identities between the two messaging services. Entries in such a mapping database may be generated as determinations are made that a user identity in the first messaging service corresponds to a user identity in the second messaging service.

In one general aspect, a method for populating identities in a message service includes registering a user of a first messaging service with a second messaging service and identifying first messaging service user identities for users other than the registered user that are stored in a list associated with the registered user. A determination is made whether each identified user identity has a matching user identity associated with the second messaging service. If so, a database associated with the second messaging service is populated with the matching user identities.

Implementations may include one or more of the following features. For example, the second messaging service and the first messaging service may be instant messaging services. The user identities associated with the first messaging service may be included in a contact list associated with the first messaging service. The user identities associated with the first and/or the second messaging services may be screen names. The database associated with the second messaging service may represent a contact list for the registered user. The method may involve populating a contact list that is associated with the second messaging service for at least one of the other users with a user identifier for the registered user.

Determining whether each identified user identity has a matching user identity associated with the second messaging service may involve identifying if a unique portion of each identified user identity is identical to a unique portion of a user identity associated with the second messaging service. In addition or as an alternative, determining if each identified user identity has a matching user identity associated with the second messaging service may involve identifying if a unique portion of each identified user identity has at least some features in common with a unique portion of a user identity associated with the second messaging service. The method may also include adjusting a required amount of common features between a unique portion of an identified user identity and a unique portion of a matching user identity associated with the second messaging service based on a degree of uniqueness of the identified user identity.

The method may include obtaining approval to populate a database associated with the second messaging service with each matching user identity. The approval may be obtained from either or both of the registered user and the other user associated with the matching user identity. Obtaining approval to populate the database with each matching user identity may include requesting confirmation from the other user associated with the matching user identity that the respective identified user identity is associated with the other user.

In another general aspect, a method for populating identities in a message service may include registering a user of a first messaging service with a second messaging service and comparing a first messaging service list, associated with the registered user, of user identities for other users of the first messaging service with a database containing a mapping of user identities associated with the first messaging service to user identities associated with the second messaging service. User identities associated with the second messaging service that correspond to entries in the first messaging service list may be identified based on matches between the first messaging service list and the database.

Implementations may include one or more of the following features. For example, the registered user may be notified of the identified user identities. The method may also include populating a second messaging service list associated with the registered user with one or both of the identified user identities. The second messaging service may include an instant messaging service and the second messaging service list may include a contact list associated with the instant messaging service for the registered user. Populating the second messaging service list may be performed in response to receiving an authorization from the registered user to populate the second messaging service list with one or more of the identified user identities. The first messaging service may be an electronic mail service, and the first messaging service list may be an address book associated with the electronic mail service.

The method may further include receiving an indication from the registered user of an identifier associated with the registered user for the first messaging service and adding an entry in the database mapping the identifier for the first messaging service to a user identity associated with the registered user for the second messaging service. The method may also include receiving an indication from the registered user of the first messaging service and accessing the first messaging service list based on the received indication. Receiving the indication of the first messaging service may also include receiving a password associated with the registered user for the first messaging service, and accessing the first messaging service list may be based on the received password.

In another general aspect, a method for managing identities in a message service may include registering a user of a first messaging service with a second messaging service and requesting an identification of a first user identifier for the registered user. The first user identifier may be associated with the first messaging service. An identification of the first user identifier may be received, and a mapping between the first user identifier and a second user identifier, associated with the second messaging service, for the registered user may be stored.

Implementations may include one or more of the following features. For example, the method may include requesting a password associated with the first user identifier for the first messaging service and receiving the password associated with the first user identifier. The method may include using the first user identifier and the password to access the first messaging service and extracting data associated with the first user identifier from the first messaging service to the second messaging service. The first messaging service may represent an instant messaging service and the extracted data may include a contact list associated with the instant messaging service. The method may include identifying user identities associated with the second messaging service that correspond to user identities in the contact list and populating a list associated with the registered user in the second messaging service with the corresponding second messaging service user identities.

Identifying user identities associated with the second messaging service may include comparing the user identities in the contact list with stored mappings between user identities associated with the first messaging service and user identities associated with the second messaging service for additional users that have previously registered with the second messaging service. The extracted data may include user profile information. The method may include registering an additional user of the first messaging service with the second messaging service, identifying the first user identifier in a first messaging service contact list for the additional user, and using the stored mapping between the first user identifier and the second user identifier to populate a second messaging service contact list for the additional user with the second user identifier. The method may include requesting an identification of the first messaging service in addition to the first user identifier and receiving the identification of the first messaging service.

The described techniques may be implemented as a method, in a system, or in a machine-readable medium that stores instructions for causing one or more processors to perform the techniques.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
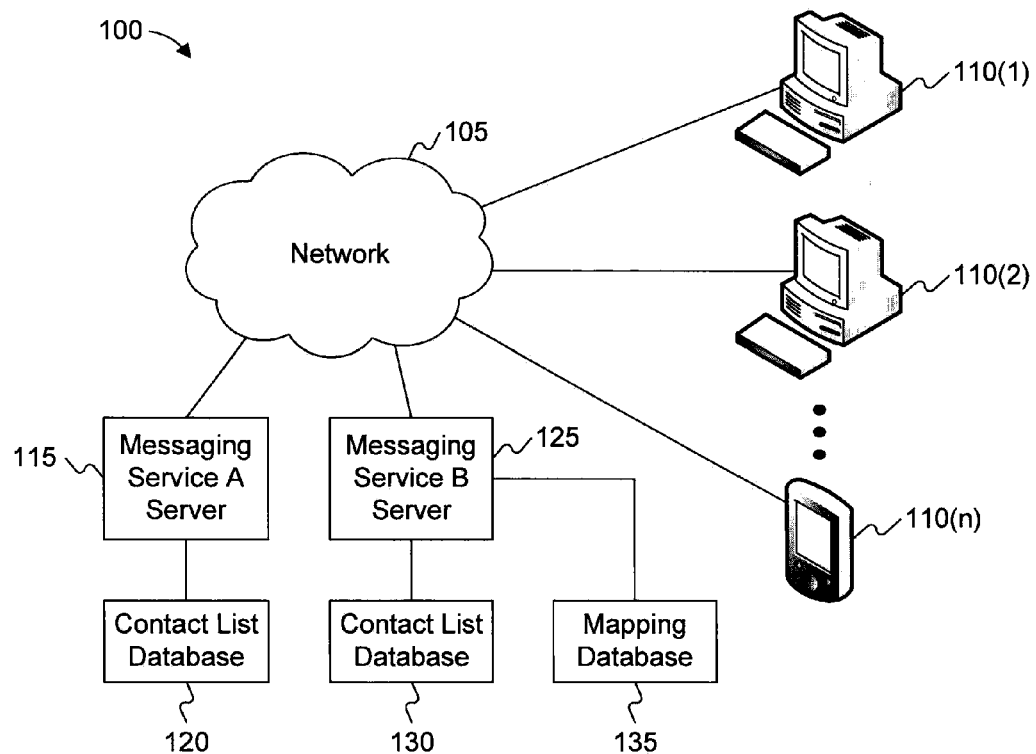
FIG. 1 is a block diagram of a representative configuration of a system for supporting messaging services between subscribers.

Techniques may be provided for facilitating the migration of subscribers from a first messaging service to a second messaging service. The techniques may be used in connection with instant messaging services, electronic mail services, and/or other messaging services. For example, if a user switches from one instant messaging service to another, adds a second messaging service, adds an electronic mail service after subscribing to an instant messaging service, or adds an instant messaging service after subscribing to an electronic mail service, such techniques may be used to populate a contact list associated with the second messaging service based on user identities contained in a contact list associated with the first messaging service. Although the following description relates primarily to instant messaging services, such as AOL Instant Messenger (AIM), it will be understood that the techniques may also be applied in the context of other messaging services.

When a user subscribes to an instant messaging service, he will typically develop a contact list of people with whom he communicates using instant messages. Because such a contact list is associated with, and can only be utilized in connection with, the particular instant messaging service, there is a disincentive to switch to a new instant messaging service. In particular, if the user wants to switch to a new instant messaging service (e.g., because of desirable features offered by the second messaging service), he must develop an entirely new contact list. Unless a number of users decide to switch at the same time, the user that switches will likely have to populate the new contact list with an entirely new set of people, who do subscribe to the new service. Even if a group of users decide to switch at the same time, each of the users would have to manually generate a new contact list on the new instant messaging service. As a result, users may be discouraged from switching to a new service because of the difficulties involved.

It is possible, however, to at least partially automate the conversion process by providing a way to populate a contact list associated with a second messaging service with entries that correspond to entries in a contact list associated with a first messaging service. Such a capability makes it easier to populate the contact list associated with the new messaging service with identifiers of users with whom the switching subscriber previously communicated with on the first messaging service.

The first subscribers to switch may initially be able to populate the new contact list with only a few, if any, identifiers of other users that have switched services. This is because, prior to anyone switching messaging services, there will be no users on the second messaging service that were previously on the first messaging service. As users switch services, however, the universe of users on the second or new messaging service who previously subscribed (or also subscribe) to the first messaging service will grow. The size of this universe may benefit users as they switch from the first to the second messaging service by providing such users with a larger set of people or user identifiers from which to populate their respective new contact lists. In addition, as new users switch from the first to the second messaging service, the user identifiers associated with such new users may be used to populate the contact list of users who previously switched from the first to the second messaging service. As a result, these techniques can be used to simplify the process of switching from one messaging service to another or adding a second messaging service both for the initial users who switch and for later users who switch, thereby avoiding disincentives against switching between messaging services.

FIG. 1 depicts a block diagram of a representative configuration of a system 100 for supporting messaging services between subscribers. The system 100 includes a network 105 (e.g., the Internet or a LAN) accessible by subscribers through client devices 110(1)-110(n), which may include personal computers, PDAs, wireless devices, and the like. A first messaging service is supported by a messaging service A server 115 that is connected to the network 105. A contact list database 120 associated with the first messaging service stores a contact list for each subscriber. Each contact list contains the screen names or other user identifiers that the subscriber has added to the contact list. Typically, these screen names or other user identifiers are associated with users with whom the subscriber communicates or has communicated. Although the description refers to screen names, other types of identifiers may be used. In addition, although the contact list database 120 is depicted as being connected to the messaging service A server 115, the contact list may additionally or alternatively be stored in one or more client devices 110 or in a database accessible by the client devices 110 and/or the messaging service A server 115 through the network 105. In another possible implementation, each contact list may be stored locally on one or more client devices 110 in the form of screen names or other user identifiers while the contact list database 120 may store routing information for the screen names or other user identifiers.

A second messaging service is supported by a messaging service B server 125 that is connected to the network 105. A contact list database 130 associated with the second messaging service stores a contact list for each subscriber. As with the contact list database 120, however, contact lists may actually be stored in a variety of different locations in the overall system 100. When a subscriber to the first messaging service switches to the second messaging service or otherwise adds a subscription to the second messaging service, the messaging service B server 125 may perform actions that assist in populating the subscriber's new contact list associated with the second messaging service and/or populating the contact lists of other subscribers to the second messaging service.

For example, the messaging service B server 125 may access the subscriber's old contact list associated with the first messaging service to determine if any of the user identities contained in the old contact list have matching identities in the second messaging service. If so, the matching identities may be added to the subscriber's new contact list associated with the second messaging service. Access to the subscriber's old contact list may be obtained, for example, by searching files contained on a client device 110 associated with the user (if the old contact list is stored in a client device 110) or by signing on to the first messaging service using a screen name and password provided by the subscriber (if the old contact list is stored in the contact list database 120 located at the messaging service A server 115 or elsewhere on the network 105). The messaging service B server 125 may be programmed with software that enables the messaging service B server 125 to access the subscriber's old contact list, although such access may require that the subscriber first provides his user name or screen name and password.

The messaging service B server 125 may additionally or alternatively refer to a mapping database 135 that stores mappings of user identifiers associated with the first messaging service to user identifiers associated with the second messaging service. For example, subscribers to the second messaging service who previously subscribed, or continue to subscribe, to the first messaging service may have an entry in the mapping database 135 that stores information associating the subscriber's first messaging service identifier with the subscriber's second messaging service identifier. This mapping information may be used by the messaging service B server 125 to populate a new subscriber's new contact list with identifiers for other users on the second messaging service who were previously on the new subscriber's old contact list associated with the first messaging service.

Furthermore, the messaging service B server 125 may store a mapping of the new subscriber's first messaging service identifier to the new subscriber's second messaging service identifier. This mapping may be stored in the mapping database 135 when the new subscriber registers with the second messaging service or at some subsequent time. The mapping that is stored in the mapping database 135 may be used to assist in populating the contact lists of other users of the second messaging service who have previously registered or who subsequently register with the second messaging service and for whom the new subscriber is contained in the other users' respective first messaging service contact lists.

Figure 2:
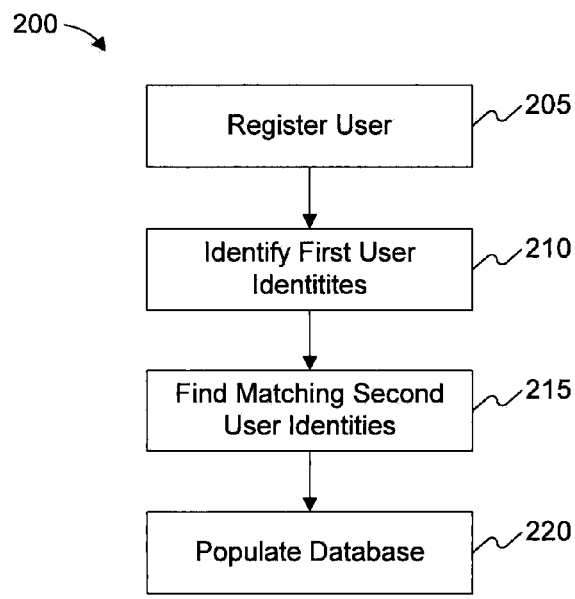
FIG. 2 is a flow diagram of a process for populating identities in a messaging service.

FIG. 2 is a flow diagram of a process 200 for populating identities in a messaging service. For example, user identities may be stored in a contact list associated with the messaging service or in some other type of database that contains user identities. The process 200 may involve registering a specific user of a first messaging service with a second messaging service (step 205). Each messaging service may have its own set of user identities. In other words, a particular set of user identities may be associated with each messaging service. The user identities may represent, for example, screen names in an instant messaging (IM) service, email addresses in an email service, or other personal identification (e.g., name, address, telephone number, and the like) for a particular user or subscriber. User identities associated with the first messaging service may be identified in a list associated with the specific user (step 210). For example, the specific user may have a contact list that contains user identities for a number of other subscribers to the first messaging service. These user identities may be identified by the second messaging service after or when the specific user registers with the second messaging service.

Next, user identities matching on the two messaging services are identified (step 215). The criteria for determining whether two user identities match may be based on any of a number of different factors. For example, user identities may be determined to match if unique portions of screen names or other identifiers are identical between the first and second messaging services. Unique portions may involve those portions of the screen names that do not include a common suffix (e.g., "@xyz.com") used by the messaging services. Alternatively, user identities may be determined to match if unique portions of screen names or other identifiers include character strings that are highly similar (e.g., that differ only by a numerical suffix, such as "johndoe" and "johndoe2"). In another alternative, user identities may be determined to match based on profile data associated with each messaging service, such as name and residential address, email address, phone number, and/or the like, assuming such information is available and accessible.

Finally, a database associated with the second messaging service may be populated with the matching user identities (step 220). For example, the database may be a contact list for the specific user or may be a mapping database (see FIG. 1) that maps user identities between the first and second messaging services. In some implementations, it may be possible to automatically populate the database with the matching user identities. Depending on the degree of certainty associated with the matching criteria, however, it may be preferable to only populate the database after confirming that the matching user identities are associated with a common user (e.g., by querying the user associated with the second messaging service user identity).

Figure 3:
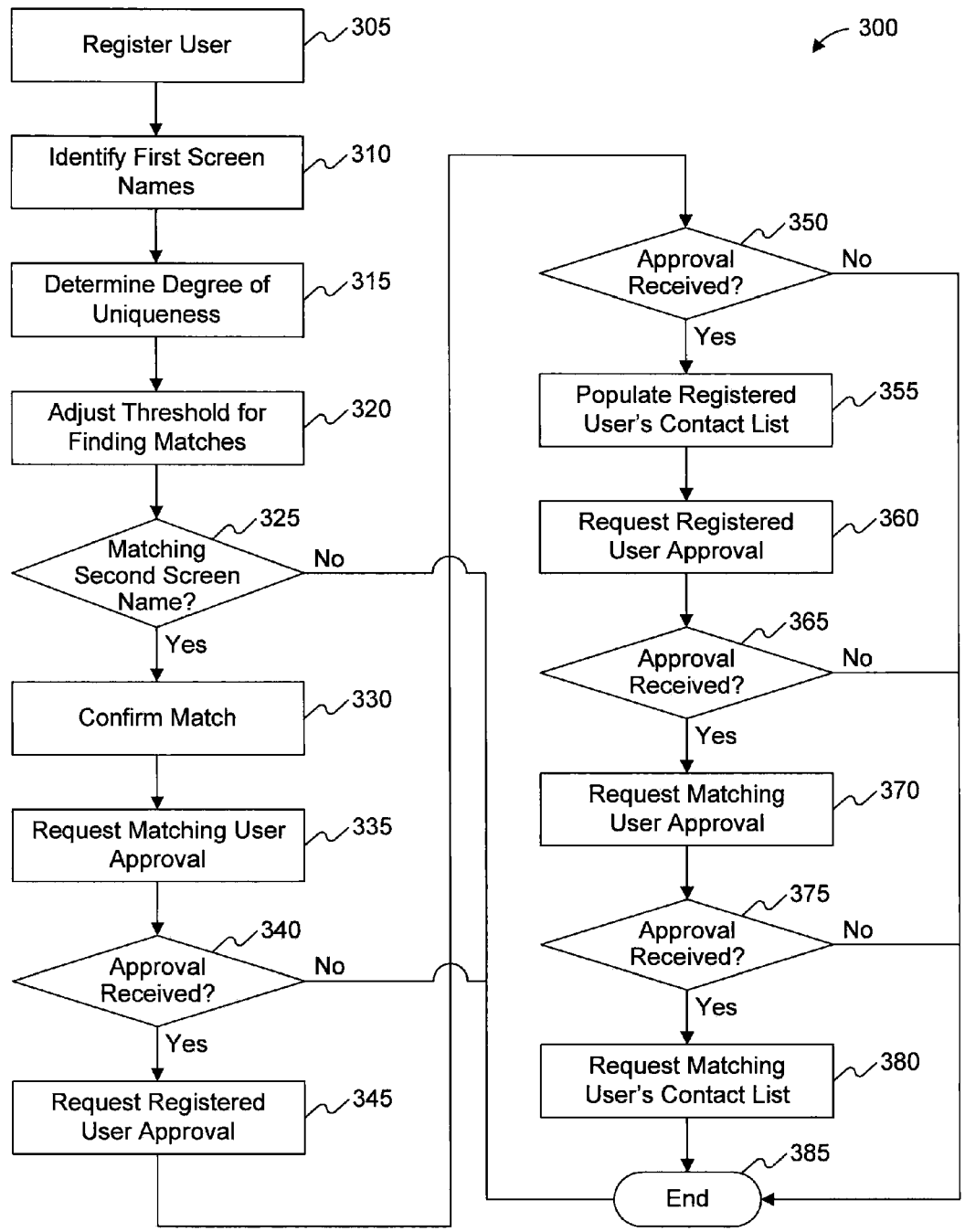
FIG. 3 is a flow diagram of a process for populating identities in an instant messaging service.

FIG. 3 is a flow diagram of a process 300 for populating identities in an instant messaging service. The process 300 may involve registering a specific user of a first instant messaging (IM) service with a second IM service (step 305). A contact list associated with the first IM service for the specific user is located, and screen names contained in the contact list are identified (step 310). In some cases, the contact list may be locally stored on a client device used by the specific user. Therefore, the contact list may be accessed by the second IM service without cooperation from the first IM service. Alternatively, the identification of screen names contained in the contact list may be performed with cooperation of the first IM service via access to the hosting services of the first IM service. As another alternative, the identification of screen names contained in the contact list may be performed without cooperation of the first IM service but nevertheless accessing the hosting services of the first IM service via the user logging into the first IM service.

For each identified screen name, a degree of uniqueness is determined (step 315). Determining the degree of uniqueness may involve determining whether or how many screen names on the second IM service are the same or similar to the identified screen name. Similarity may be judged by whether character strings that represent screen names on the second IM service have at least a certain percentage of characters in common with the identified screen name, or at least a certain percentage of common characters in the portion of each name that precedes a domain name or other prefix/suffix known to differ among the services. Thus, two screen names may be considered similar if they differ only by a numerical suffix or if they represent alternative spellings. An analysis of similarity may be performed according to any desired criteria and may be implemented, for example, using software designed to correlate each identified screen name with screen names associated with the second IM service. Based on the degree of uniqueness, a threshold level of similarity for finding a matching screen name may be adjusted (step 320). In some implementations, matches may be determined based only on an exact correspondence between the user-specific portions of the screen names, and steps 315 and 320 may be omitted.

Next, a determination is made as to whether each identified screen name has a matching screen name associated with the second IM service (step 325). In some implementations, a match may require that a unique portion of each screen name is identical, while in other implementations, a match may only require some degree of similarity (e.g., in accordance with the adjusted threshold level of similarity). A match may also involve presenting a list of potential matching screen names (and/or other identification information associated with the screen name) to the specific user for her selection of which potential matching screen names may represent an actual match. If a match (or potential match) is found, a determination may be made as to whether a user associated with the matching screen name was once associated with the identified screen name (step 330). This determination may be desirable to confirm that there is a match and may be made by querying the user associated with the matching screen name if he is or was also associated with the corresponding identified screen name on the first IM service, or by consulting a profile maintained by or for that user reflecting the same.

If it is determined at step 330 that the matching screen name was once associated with the identified screen name, approval to populate the specific user's new contact list (i.e., the contact list associated with the second IM service) with the matching screen name may be requested from the user associated with the matching screen name (step 335). In addition, the matching screen name may be added to a database (see, e.g., reference numeral 135 in FIG. 1) that maps the identified screen name to the matching screen name. Such a process is described below in greater detail in connection with FIGS. 6 and 7. If approval is received (step 340), approval to populate the specific user's new contact list with the matching screen name may be requested from the specific user (step 345). This ensures that the specific user actually wants the matching screen name in her new contact list. If approval is received (step 350), the specific user's new contact list is populated with the matching screen name (step 355). If either user denies approval, the process may end (step 385).

In addition to populating the specific user's new contact list with the matching screen name, it may also be desirable to enable populating the second IM service contact list for the user associated with the matching screen name with the second IM service screen name for the specific user. This capability would simplify the process of switching to a new IM service and the process of populating contact lists. Accordingly, approval to populate the contact list for the user associated with the matching screen name with the specific user's second IM service screen name may be requested from the specific user (step 360). If approval is received (step 365), approval to populate the contact list for the user associated with the matching screen name with the specific user's second IM service screen name may be requested from the user associated with the matching screen name (step 370). If approval is received (step 375), the contact list for the user associated with the matching screen name is populated with the specific user's screen name (step 380). If either user denies approval, the process may end (step 385).

In some implementations, the process 300 of populating identities in an instant messaging service may be limited to situations in which the search for matching users is performed at or about the time that the specific user registers with the second IM service. In such a case, the search for second IM service screen names that match first IM service screen names contained in the specific user's old contact list is essentially limited to users who registered with the second IM service prior to the specific user. In other implementations, however, it may be possible to perform the process 300 at any time. Thus, the search for second IM service screen names that match first IM service screen names contained in the specific user's old contact list may also include users who registered with the second IM service after the specific user. Searching subsequent to the initial registration might occur, for example, at a defined (by the user or system) time or interval, or if the specific user does not initially make her first IM service contact list available to the second IM service for searching or if a periodic update search is desirable to increase the population of the specific user's new contact list. As another alternative, a mapping may be maintained of all users who have switched from the first IM service to the second IM service and that have requested updates for their old contact list. The mapping can be between each first IM service screen name and all of the users on the second IM service who request notification if the person with the first IM service screen name switches to the second IM service. If the person with the first IM service screen name subsequently switches, the contact lists for all of the users on the second IM service who requested notification can be automatically updated.

As an illustrative example, John, Andrea, and Bob may subscribe to a first IM service (e.g., AOL Instant Messenger) and may have first IM service screen names of "JohnP", "AndreaH", and "BobH," respectively. In addition, each of John, Andrea, and Bob may be on one another's first IM service contact list. John might also subscribe to a second IM service (e.g., XYZ Instant Messaging) and have a second IM service screen name of "JohnP@xyz.com". If Andrea subsequently switches to the second IM service, a server associated with the second IM service may identify John's first IM service screen name (and any other screen names) in Andrea's first IM service contact list. The second IM service server may then compare the screen name "JohnP" with screen names in the second IM service to determine if a matching screen name exists in the second IM service. In this case, the second IM service server may identify the screen name "JohnP@xyz.com" as a potentially matching screen name. Accordingly, the second IM service server may ask John for confirmation that the screen names both belong to the same user and may request consent from John and/or Andrea before populating Andrea's and/or John's second IM service contact list(s) with the other's second IM service screen name.

In addition to populating contact lists based on a presumption that matches between screen names represent a common user as described in connection with FIGS. 2 and 3, it may also be possible to populate contact lists based on a stored mapping of different messaging service identities. In particular, a database may store information linking an identity used in one messaging service to an identity used in another messaging service, thereby indicating that both identities are associated with the same user.

Figure 4:
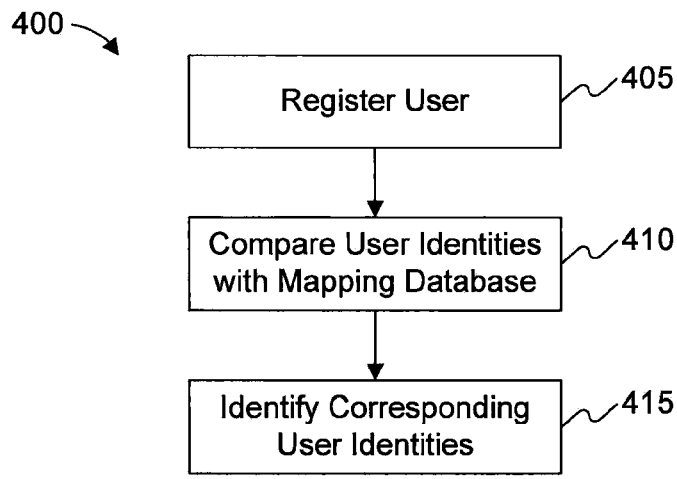
FIG. 4 is a flow diagram of a process for populating identities in a messaging service using information stored in a mapping database.

FIG. 4 is a flow diagram of a process 400 for populating identities in a messaging service using information stored in a mapping database. The process 400 may involve registering a specific user of a first messaging service with a second messaging service (step 405). User identities in a first messaging service list associated with the specific user may be compared with a mapping database that contains information linking identities between the first and second messaging services (step 410). The first messaging service list may represent a contact list that contains user identities for a number of other subscribers to the first messaging service. Based on the comparison in step 410, an identification is made of user identities associated with the second messaging service that correspond to user identities in the first messaging service list (step 415). For example, for each user identity in the first messaging service list, it is determined if the user identity has an entry in the mapping database that links the first messaging service user identity to a corresponding second messaging service user identity.

Figure 5:
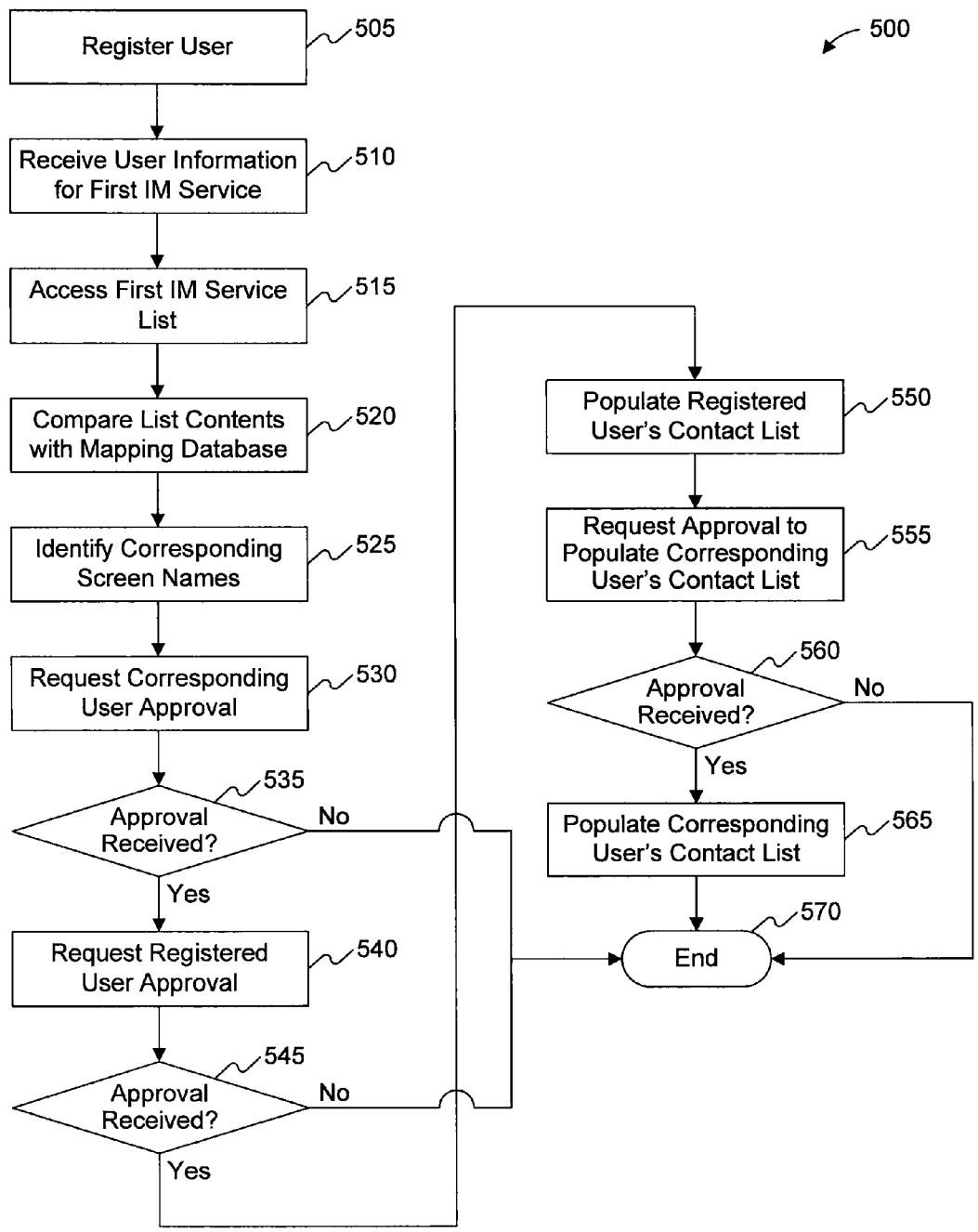
FIG. 5 is a flow diagram of a process for populating identities in an instant messaging service.

FIG. 5 is a flow diagram of a process 500 for populating identities in an instant messaging service. FIG. 5 represents a more detailed implementation of the process 400 depicted in FIG. 4. The process 500 may involve registering a specific user of a first instant messaging (IM) service with a mapping service (e.g., see FIG. 4) or a second IM service (step 505). At the time of registration or at some subsequent time, an identification may be received from the specific user of the first IM service, the specific user's screen name in the first IM service, and an associated password (step 510). For example, when the specific user registers for the second IM service, she may be asked whether she would like for the second IM service to attempt to migrate as much as possible of her current IM service contact list to the second IM service. If so, the specific user may be queried to identify the first IM service and to provide her first IM service screen name and password.

Using the received first IM service screen name and password, a first IM service list associated with the specific user may be accessed (step 515). As part of this access, first IM service screen names may be extracted or otherwise identified from the first IM service list, which may reside on a local IM client. The screen names in the first IM service list may then be compared with a mapping database that stores information regarding which first IM service screen names have corresponding screen names in the second IM service (step 520). Based on this comparison, screen names associated with the second IM service that correspond to entries in the first IM service list may be identified (step 525).

If it is determined at step 525 that the second IM service includes screen names that correspond to entries in the first IM service list, approval to populate the specific user's second IM service contact list with the corresponding screen name may be requested from the user associated with the corresponding screen name (step 530). If approval is received (step 535), approval to populate the specific user's second IM service contact list with the corresponding screen name may be requested from the specific user (step 540). This ensures that the specific user actually wants the corresponding screen name in her new contact list. If approval is received (step 545), the specific user's second IM service contact list is populated with the corresponding screen name (step 550). If either user denies approval, the process may end (step 570).

In addition, approval to populate the second IM service contact list for the user associated with the corresponding screen name with the specific user's second IM service screen name may be requested from the specific user and/or from the user associated with the corresponding screen name (step 555). If approval is received (step 560), the contact list for the user associated with the corresponding screen name is populated with the specific user's screen name (step 565). If either user denies approval, the process may end (step 570).

In some implementations, the process 500 of populating identities in an instant messaging service may be limited to situations in which the search for corresponding screen names is performed at or about the time that the specific user registers with the second IM service. In such a case, the search for second IM service screen names that correspond to first IM service screen names contained in the specific user's first IM service contact list is essentially limited to users who registered with the second IM service prior to the specific user. In other implementations, however, it may be possible to also perform the process 500 at a later or periodically recurring time. Thus, the search for second IM service screen names that match first IM service screen names contained in the specific user's first IM service contact list may also include users who registered with the second IM service after the specific user. The need to perform a search subsequent to the initial registration might occur, for example, if the specific user does not initially make her first IM service contact list available to the second IM service for searching or if a periodic update search is desirable to increase the population of the specific user's second IM service contact list.

Continuing with the above illustrative example, once John and Andrea have registered with the second IM service, a mapping database may contain information relating John's and Andrea's respective first IM service screen names to their respective second IM service screen names. Accordingly, if Bob subsequently switches to the second IM service, a server associated with the second IM service may compare John's and Andrea's first IM service screen names in Bob's first IM service contact list with a mapping database to identify John's and Andrea's respective second IM service screen names as corresponding to their respective first IM service screen names. Accordingly, the second IM service server may request consent from John, Andrea, and/or Bob before populating Bob's, Andrea's, and/or John's second IM service contact list(s) with the others' second IM service screen names.

Figure 6:
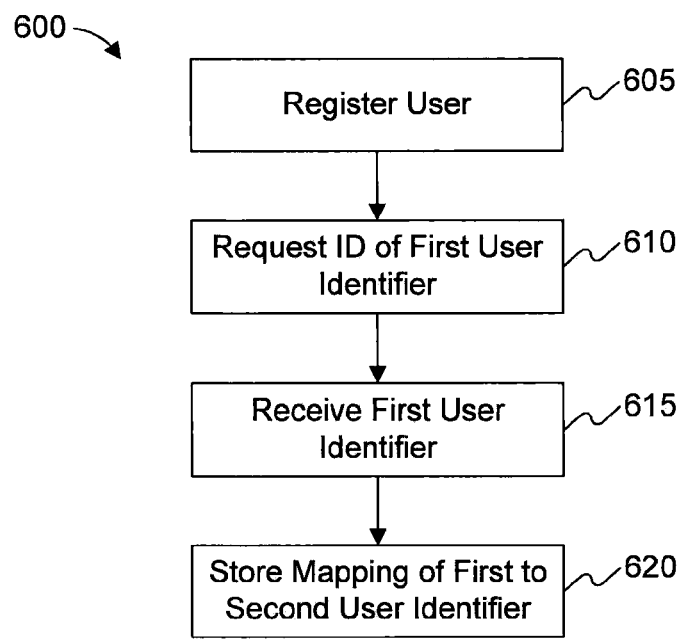
FIG. 6 is a flow diagram of a process for populating a mapping database associated with a messaging service.

FIG. 6 is a flow diagram of a process 600 for populating a mapping database associated with a messaging service. For example, information indicating that a particular user identity associated with one messaging service belongs to the same user as a corresponding user identity associated with another messaging service may be stored in a mapping database. This information can be used to assist in populating contact lists, as described above, or for any other desired purpose. The process 600 may involve registering a specific user of a first messaging service with a second messaging service (step 605). An identification of a first user identifier associated with the first messaging service for the specific user may be requested at the time the specific user registers with the second messaging service or at some later time (step 610). For example, the specific user may be asked as part of the registration process with the second messaging service to identify whether he has previously used another messaging service and to identify his user identifier for that previous messaging service. Similarly, the specific user may be asked to confirm whether he was previously associated with a particular identifier during a process of populating another user's contact list.

An identification of the first user identifier may be received (step 615). Generally, this identification is requested by and received by the second messaging service, which is already aware of a second user identifier associated with the second messaging service for the specific user. Accordingly, a mapping between the first user identifier and the second user identifier may be stored (step 620).

Figure 7:
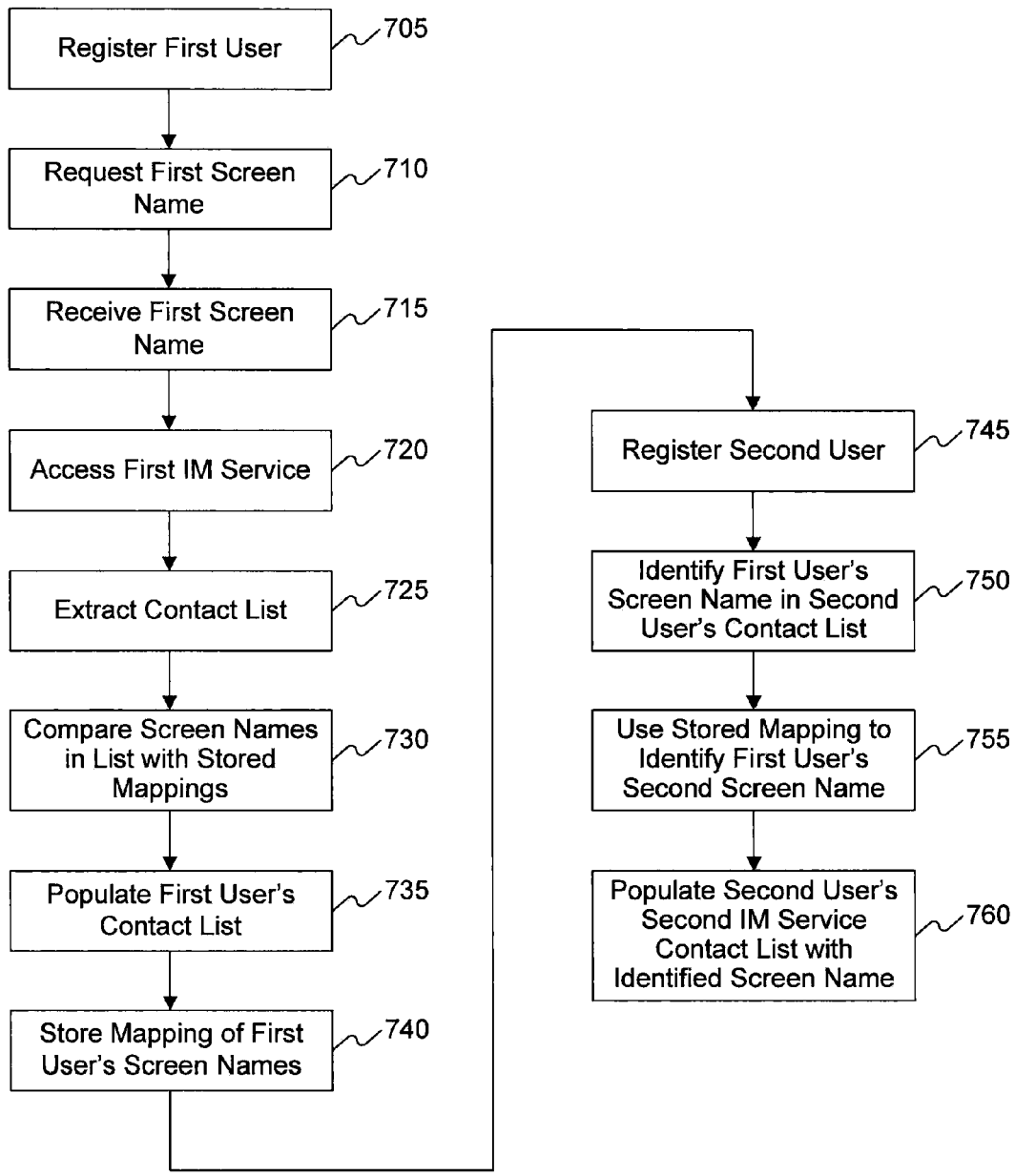
FIG. 7 is a flow diagram of a process for populating a mapping database and contact lists in an instant messaging service.

FIG. 7 is a flow diagram of a process 700 for populating a mapping database and contact lists in an instant messaging service. The process 700 may involve registering a first registered user of a first instant messaging (IM) service with a second IM service (step 705). A request may be sent to the first registered user to identify the first IM service and for an identification of a first IM service screen name and associated password for the first registered user (step 710). An identification of the first IM service, the first IM service screen name, and the associated password may be received in response to the request (step 715), and the first IM service screen name and associated password may be used to access the first IM service (step 720). First IM service contact list and/or other data may be extracted from the first IM service (step 725). Alternatively, the first registered user may themselves obtain the first IM service contact list and/or convey the first IM service list to the second IM service or may otherwise log onto the first IM service to allow the data extraction. Using the extracted data, screen names in the first IM service contact list may be compared with mappings of screen names between the first and second IM services that are stored in a mapping database (step 730). Based on mappings that match the screen names in the first IM service contact list, the first registered user's second IM service contact list is populated with the corresponding second IM service screen names stored in the mapping database (step 735).

In addition, a mapping of the first registered user's first IM service screen name to the first registered user's second IM service screen name is stored in the mapping database (step 740). A second user of the first IM service also registers with the second IM service (step 745). The first registered user's first IM service screen name may be identified in a first IM service contact list for the second registered user (step 750). The mapping between the first and second IM service screen names for the first registered user that was stored at step 740 is used to identify the first registered user's second IM service screen name (step 755). A second IM service contact list for the second registered user can be populated with the screen name identified in step 755 (step 760).

Returning to the above illustrative example, when Bob switches to the second IM service, a server associated with the second IM service may request that Bob identify any previous IM service, along with his screen name for the previous IM service. Bob may identify the first IM service and provide his first IM service screen name. The second IM service server may store a mapping of Bob's first IM service screen name to his second IM service screen in a mapping database. As a result, subsequent users of the first IM service who register with the second IM service (and who have first IM service contacts lists that include Bob's first IM service screen name) can benefit from the contents of the mapping database by obtaining an automated or partially automated populating of their second IM service contact lists.

Figure 8:
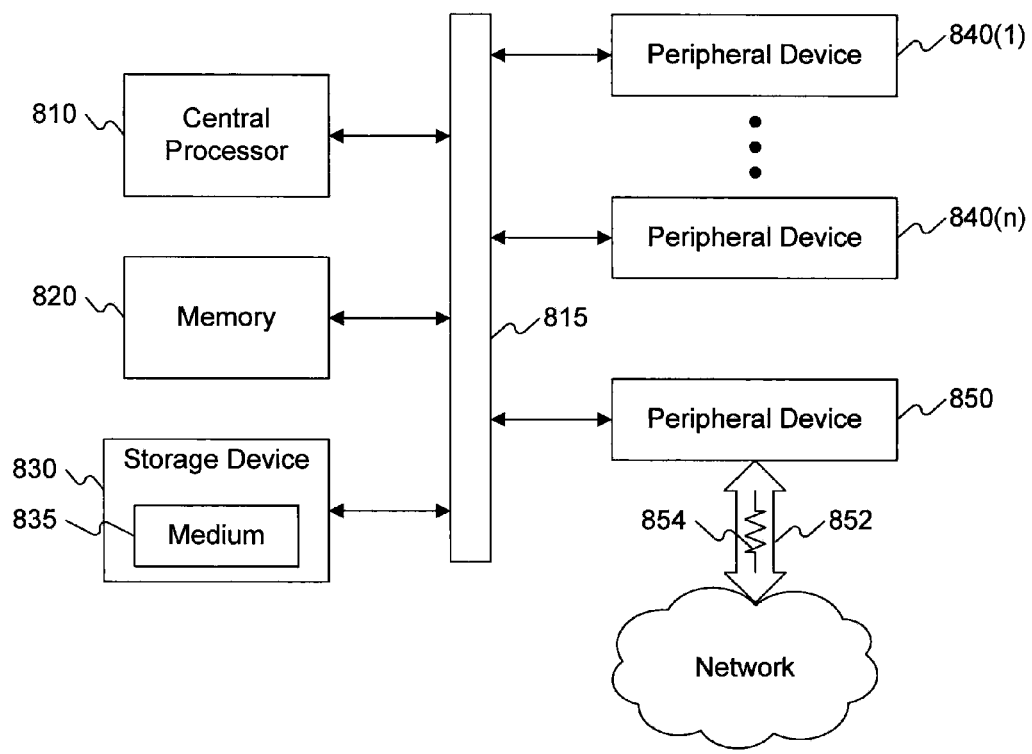
FIG. 8 is a block diagram illustrating an example of a data processing system, which may be used to implement a system for populating user identifiers in a messaging service.

FIG. 8 is a block diagram illustrating an example data processing system 800, which may be used to implement a system for populating user identifiers in a messaging service. The data processing system 800 includes a central processor 810, which executes programs, performs data manipulations and controls tasks in the system 800. The central processor 810 is coupled with a bus 815 that can include multiple busses, which may be parallel and/or serial busses.

The data processing system 800 includes a memory 820, which can be volatile and/or non-volatile memory, and is coupled with the communications bus 815. The system 800 can also include one or more cache memories. The data processing system 800 can include a storage device 830 for accessing a storage medium 835, which may be removable, read-only, or read/write media and may be magnetic-based, optical-based, semiconductor-based media, or a combination of these. The data processing system 800 can also include one or more peripheral devices 840(1)-840(n) (collectively, devices 840), and one or more controllers and/or adapters for providing interface functions.

The system 800 can further include a communication interface 850, which allows software and data to be transferred, in the form of signals 854 over a channel 852, between the system 800 and external devices, networks, or information sources. The signals 854 can embody instructions for causing the system 800 to perform operations. The system 800 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 800 and/or delivered to the machine 800 over a communication interface. These instructions, when executed, enable the machine 800 to perform the features and function described above. These instructions represent controllers of the machine 800 and can be implemented in a high-level procedural and/or object-oriented programming language, and/or in assembly/machine language. Such languages can be compiled and/or interpreted languages.

These instructions may be stored on a machine-readable medium or a non-transitory machine-readable medium. As used herein, the term "machine-readable medium" refers to any computer program product, apparatus and/or device used to provide machine instructions and/or data to the machine 800, including a machine-readable medium that receives machine instructions as a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. The described techniques and systems may also find utility in connection with other devices that can support messaging services, such as PDAs.

A number of implementations have been described. Nevertheless, it will be understood that various modifications may be made. For example, many of the steps of the various processes described above may be omitted and/or performed in a different order than illustrated and described. The techniques may also be used by any system or process that implements a transition of an email, phone, or other contact list from one service provider to another. Such a transition may be bolstered by determining and alerting the user to other email addresses or telephone numbers related to identities on the list being transitioned. In addition, although the description indicates that users are typically asked for permission before adding identifiers to the user's or another user's contact list, some implementations may not require permission to be granted. Accordingly, other implementations are within the scope of the following claims.

What is claimed is:

1. A method for populating identities in a message service, the method comprising:
registering a user of a first instant messaging service with a second instant messaging service different from the first instant messaging service;
identifying user identities for users other than the registered user, wherein the user identities are associated with the first instant messaging service and the user identities are stored in a list associated with the registered user;
determining when at least one of the user identities from the list of user identities has a matching user identity associated with the second instant messaging service comprising: identifying a unique portion of each user identity associated with the first instant messaging service has at least a required amount of common features with a unique portion of a user identity associated with the second instant messaging service;
determining a degree of uniqueness of the user identity associated with the second instant messaging service; adjusting the required amount of common features between the unique portion of each user identity associated with the first instant messaging service and a unique portion of a matching user identity associated with the second instant messaging service based on the determined the degree of uniqueness of the user identity associated with the second instant messaging service;
populating, by a hardware processor, a database associated with the second instant messaging service with the matching user identities; and
storing the database associated with the second instant messaging service, the database accessible by the second instant messaging service.

2. The method of claim 1 wherein the user identities associated with the first instant messaging service are included in a contact list associated with an instant messaging service of the first instant messaging service.

3. The method of claim 2 wherein the user identities associated with the first instant messaging service comprise screen names.

4. The method of claim 2 wherein the database associated with the second instant messaging service comprises a contact list for the registered user that is associated with the second instant messaging service.

5. The method of claim 1 further comprising populating a contact list, associated with the second instant messaging service, for at least one of the other users with a user identifier for the registered user.

6. The method of claim 1 wherein determining when each identified user identity has a matching user identity associated with the second instant messaging service comprises identifying unique portion of each identified user identity is identical to a unique portion of a user identity associated with the second instant messaging service.

7. The method of claim 1 further comprising obtaining approval to populate a database associated with the second instant messaging service with each matching user identity, wherein the approval is obtained from at least one of the registered user and the other user associated with the matching user identity.

8. The method of claim 1 further comprising obtaining approval to populate the database with each matching user identity, wherein the approval is obtained from at least one of the registered user and the other user associated with the matching user identity.

9. The method of claim 8 wherein obtaining approval to populate the database with each matching user identity comprises requesting confirmation from the other user associated with the matching user identity that the respective identified user identity is associated with the other user.

10. The method of claim 1 wherein determining when at least one of the identified user identities has a matching user identity associated with the second instant messaging service comprises determining when each identified user identity has a matching user identity associated with the second instant messaging service.

11. The method of claim 1 wherein determining when at least one of the identified user identities has a matching user identity associated with the second instant messaging service comprises determining when profile data associated with the at least one of the identified user identities matches profile data associated with a potential matching user identity.

12. The method of claim 1 wherein at least one of the matching user identities and the identified user identities comprise electronic mail addresses.

13. An article comprising a non-transitory machine-readable medium storing instructions for causing one or more hardware processors to perform operations comprising:
    registering a user of a first instant messaging service with a second instant messaging service different from the first instant messaging service;
    identifying user identities for users other than the registered user, wherein the user identities are associated with the first instant messaging service and the user identities are stored in a list associated with the registered user;
    determining when at least one of the user identities from the list of user identities has a matching user identity associated with the second instant messaging service comprising: identifying a unique portion of each user identity associated with the first instant messaging service has at least a required amount of common features with a unique portion of a user identity associated with the second instant messaging service;
    determining a degree of uniqueness of the user identity associated with the second instant messaging service; adjusting the required amount of common features between the unique portion of each user identity associated with the first instant messaging service and a unique portion of a matching user identity associated with the second instant messaging service based on the determined the degree of uniqueness of the user identity associated with the second instant messaging service;
    populating, by the one or more hardware processors, a database associated with the second instant messaging service with the matching user identities; and
    storing the database associated with the second instant messaging service, the database accessible by the second instant messaging service.

14. The article of claim 13 wherein the user identities associated with the first instant messaging service are included in a contact list associated with the first instant messaging service.

15. The article of claim 14 wherein the user identities associated with the first instant messaging service comprise screen names.

16. The article of claim 14 wherein the non-transitory machine-readable medium stores instructions for causing one or more processors to perform further operations comprising populating a contact list, associated with the second instant messaging service, for at least one of the other users with a user identifier for the registered user.

17. The article of claim 13 wherein determining when each identified user identity has a matching user identity associated with the second instant messaging service comprises identifying a unique portion of each identified user identity is identical to a unique portion of a user identity associated with the second instant messaging service.

18. The article of claim 13 wherein the non-transitory machine-readable medium stores instructions for causing one or more processors to perform further operations comprising: requesting approval to populate a database associated with the second instant messaging service with each matching user identity; and receiving the approval from at least one of the registered user and the other user associated with the matching user identity.

19. The article of claim 13 wherein the non-transitory machine-readable medium stores instructions for causing one or more processors to perform further operations comprising: requesting approval to populate the database with each matching user identity; and receiving the approval from at least one of the registered user and the other user associated with the matching user identity.

20. The article of claim 19 wherein requesting approval to populate the database with each matching user identity comprises requesting confirmation from each of the other users associated with the matching user identities that the respective identified user identity is associated with the other user.

21. The article of claim 13 wherein determining when at least one of the identified user identities has a matching user identity associated with the second instant messaging service comprises determining when each identified user identity has a matching user identity associated with the second instant messaging service.

22. A system for populating identities in an instant message service, the system comprising:
    one or more hardware processors; and
    a memory storing instructions, when executed by the one or more hardware processors to cause the one or more hardware processors to perform operations including:
    registering a user of a first instant messaging service with a second instant messaging service different from the first instant messaging service;
    identifying user identities for users other than the registered user, wherein the user identities are associated with the first instant messaging service and the user identities are stored in a list associated with the registered user;
    determining when at least one of the user identities from the list of user identities has a matching user identity associated with the second instant messaging service comprising: identifying a unique portion of each user identity associated with the first instant messaging service has at least a required amount of common features with a unique portion of a user identity associated with the second instant messaging service;
    determining a degree of uniqueness of the user identity associated with the second instant messaging service; adjusting the required amount of common features between the unique portion of each user identity associated with the first instant messaging service and a unique portion of a matching user identity associated with the second instant messaging service based on the determined the degree of uniqueness of the user identity associated with the second instant messaging service;
    populating, by the one or more hardware processors, a database associated with the second instant messaging service with the matching user identities; and
    storing the database associated with the second instant messaging service, the database accessible by the second instant messaging service.

* * * * *